Feb. 3, 1925.

P. M. J. BOUCHEROT 1,525,062

ARMORED CABLE WITH MULTIPLE CONDUCTORS

Filed March 31, 1921    2 Sheets-Sheet 1

Inventor:
P. M. J Boucherot by
Lawrence Langner
Attorney

Feb. 3. 1925.

P. M. J. BOUCHEROT 1,525,062

ARMORED CABLE WITH MULTIPLE CONDUCTORS

Filed March 31, 1921   2 Sheets-Sheet 2

Inventor:
Paul Marie Joachim Boucherot
By Lawrence Langner
Attorney.

Patented Feb. 3, 1925.

1,525,062

UNITED STATES PATENT OFFICE.

PAUL MARIE JOACHIM BOUCHEROT, OF PARIS, FRANCE.

ARMORED CABLE WITH MULTIPLE CONDUCTORS.

Application filed March 31, 1921. Serial No. 457,350.

(GRANTED UNDER THE PROVISIONS OF THE ACT OF MARCH 3, 1921, 41 STAT. L., 1313.)

*To all whom it may concern:*

Be it known that I, PAUL MARIE JOACHIM BOUCHEROT, a citizen of the French Republic, and a resident of Paris, France, have invented new and useful Improvements in Armored Cables with Multiple Conductors, of which the following is a specification.

In the application of subterranean cables to the distribution of single phase or polyphase alternating currents, there is encountered the troublesome great electrostatic capacity of these cables which may give rise to resonance phenomena and to dangerous excess voltages which are found accidentally or otherwise associated with the self-induction of certain apparatus such as transformers, motors or alternators. On the other hand, when the cables used have several conductors enclosed in the same iron armoring, either when two conductors of a monophase line or the whole of the conductors of a polyphase line are being dealt with, the normal self inductance of these cables is very slight in spite of the presence of the magnetic armor and does not play a practical part in the appearance of the resonance phenomena and the production of excess voltages. It is quite another matter however, when, in consequence of accidental causes (earthing of one of the conductors of the cable for example), the magneto-motive forces of the different conductors of the cable no longer balance. The self-inductance acquired by one or more of the conductors may then become dangerous.

For example, for an armored cable with two conductors, the self-inductance which normally, when the two conductors are traversed by equal currents and in opposite directions, does not exceed several ten thousands of a henry, becomes 40 or 50 times greater when one only of the conductors is traversed by current and 80 to 100 times greater when the two conductors are traversed by two equal currents in the same direction. Thus with armored cables having multiple conductors, and without the interposition of other apparatus possessing self-induction, very dangerous resonance effects may be produced when cables for single phase alternating currents or for polyphase alternating currents are being used.

In the annexed drawings.

Figure 1:
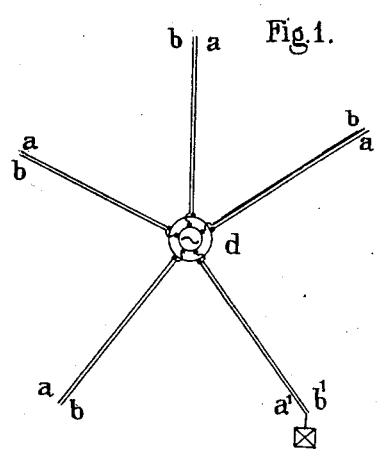
Figures 1 and 2 are diagrammatic views explaining the production of the phenomena of resonance, which this invention has a view to suppress.
Figure 2:
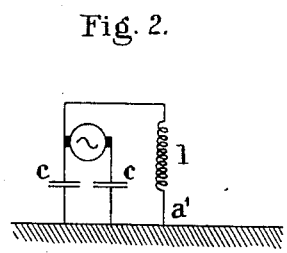

Figure 1 represents in its simplest form, a distributing network for single phase alternating currents, comprising a central factory, which for simplicity is considered to have but a single alternator $d$, and five armored cables radiating from the factory, each of the cables being of 20 km. in length and each containing two conductors, $a$, $b$. If the end of one of these conductors $a^1$ for example, is accidentally grounded, an alternating current will pass through this conductor, through the ground, and will return to the alternator $d$ through the capacities of the other cables. The current in conductor $a^1$ being greater than the current in the reverse direction of the conductor $b^1$, a flux is formed in the armor of the cable, or in other words, there develops a very considerable accidental self-induction in the conductor $a^1$. If it is considered that all the capacities are placed at a single pole of the alternator it is easy to say that there results an arrangement such as that of Figure 2. In Figure 2 each of the condensers $c$, $c$ represents the capacity of one pole with respect to the earth, and $l$ represents the accidental self-induction of conductor $a^1$. It is easy to show by calculus that with the indicated numerical values, the condition of resonance is practically realized for a frequency of 50 cycles per second, and that, under such conditions, the potential of the entire installation with respect to the earth is considerably raised by the electromotive force induced in conductor $a^1$, which force may easily attain 20,000 volts. The harmonics are produced obviously for much smaller lengths and if the system is polyphase the condition of resonance is satisfied for any frequency with still shorter lengths of cable.

It is not even necessary to have a system of two or more cables; the calculation shows that a single cable having two conductors of about 50–60 kilometers in length, of which one of the conductors is earthed at its end farthest from the source, the end of the other remaining insulated, is in resonance with itself for a current frequency of 40 to 50 cycles, the earthed wire acting as a self-induction, the insulated wire as a capacity in series therewith. A polyphase cable enters into resonance for a shorter length.

The present invention has for its object the application to cables with multiple conductors of arrangements which serve to prevent accidents such as those referred to either by avoiding resonance or by allowing it to be produced and taking steps such that the excess voltages will not become dangerous. It is obvious that the arrangements will maintain their efficiency in connection with excess voltages of other origin than those just indicated merely by way of example.

In principle, the invention consists in enclosing the magnetic armor of cables having multiple conductors by secondary electric circuits of suitable resistance, in a manner known in connection with the reduction of the self inductance of armored cables with single conductors, these secondary circuits being traversed by induced currents having for their effect, on the one hand, to reduce the flux in the armor, that is to say the electromotive force induced in the conductors, and, on the other hand, to develop in these conductors an electro-motive force in phase with the current which limits the excess voltage.

It is suitable for the application of my invention to use closed electric circuits about the variable flux of the armor. These circuits should each have a suitable resistance, the calculation of which will be later explained.

Several arrangements may be employed, such as are represented in Figures 3, 4, 5 and 6.

In all these figures, A is a tubular casing of lead which protects the insulation of the main conductors against humidity. These main conductors are not shown but will be placed in the space indicated by H. F designates the two iron hoops which constitute the tubular armor, and G designates the tubular casing of cordage or jute, which protects the iron against oxidation.

Figure 3:
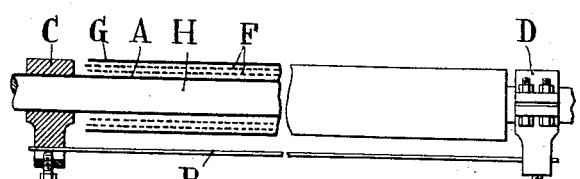
Figures 3, 4, 5 and 6 are longitudinal sections through various forms of applicant's invention of an armored cable.

In Figure 3 the secondary circuit, mentioned above, is constituted by the lead casing A and the conductor B, placed outside of the cable, the casing A and the conductor B being connected together at the two ends of the cable by metallic members C and D. These members C, D are represented as fixed to the lead casing A by a clamp, but they may be soldered or welded to the tube A if desired. The conductor B is shown as fixed in the members C and D by screws, but here again, it also may be soldered or welded to these members. The conductor B may be of any metal whatsoever, it being only necessary that its resistance be suitable.

Figure 4:
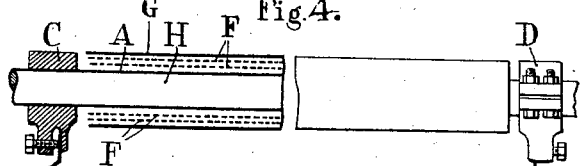

In Figure 4 the secondary circuit consists of a tube of lead A, metallic members C and D, placed on the outside of the cable and upon the tube A, and the chambers E, E connecting the members C, D to ground. The same remarks, as in the preceding case are here applicable. It is very necessary to effect a good ground connection.

The arrangements of Figures 3 and 4 are applicable to existing installations without necessitating taking the cables out of the ground.

Figure 5:
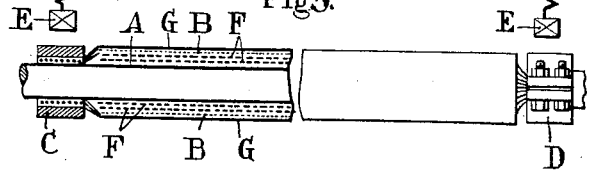
Figure 6:
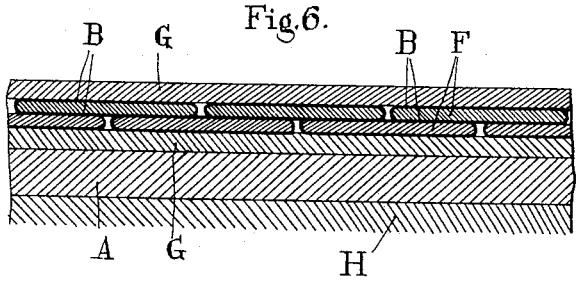

In new installations it may be preferable to apply the construction of Figures 5 and 6, which may be done during the manufacture of the cables.

In Figure 5, the secondary circuit is constituted by a lead tube A and by a conductor B of small metal wires or lamina, rolled about the cable in a steep pitched helix, positioned outside of the hoops F and inside of the casing of cordage or jute G. These different parts are then connected together by metallic members C, D which are clamped or soldered as above.

The arrangements of Figures 3, 4 and 5 may be applied to each length of cable between the junction boxes, or to several lengths together, care being taken to connect together the various lengths of lead tubing and of auxiliary conductors, in order to form a closed electric circuit surrounded by the armor, over the entire length of the cable considered.

If it is desired to utilize the lead tube A as part of the secondary circuit, the rings F of the armor may be covered with a layer of metal which is a better conductor than lead, in which layer the secondary currents develop. This layer may be of copper or other metal either electrolytically or mechanically placed on the lead before placing the hoops on the cable.

In Figure 6, the two layers of hoops F, represented on a larger scale than in the other figures are covered with a good conducting metal B, as represented by a heavy line surrounding the sections of the armor.

It has been stated above that the metal constituting the secondary electric circuits or forming a secondary circuit with the lead may be of any kind, but that the resistance of the circuit or circuits should be suitably chosen. According to circumstances, it may be desired to make this resistance greater or smaller; if it is small, the apparent self-inductance of the cable is much reduced but its resistance is increased slightly. If it is great, the self-inductance and the resistance of the conductor are not affected; for a certain value of the secondary resistance, the supposed resistance of the conductor passes the maximum. This secondary resistance must therefore be determined according to what is proposed to be done. In certain cases, even these resistances may be required to be varied if the net-work changes in extent for instance. The resistance may even be formed of iron so that advantage may be taken of the variation in resistance with the frequency.

It is clear that when the secondary resistance is to be as small as possible the resistance may be reduced completely by earthing as in Fig. 4. The lead tube may be reinforced or doubled with a conductor of copper in the arrangements shown in Figs. 3, 4 and 5.

It frequently happens that several armored cables are to be established, or are established, parallel one to another, in the same trench, either they are to operate simultaneously, or some of them are intended to act as spare cables or as emergency cables for the others. In such cases the cost of installing the protective devices, described above, may be considerably reduced by taking account of the following conditions:

1°—Whether the cables are to operate simultaneously, it is then sufficient to provide a single external conductor B, common to all the cables, the protective lead sheaths A of said cables being connected together in parallel and with the common external conductor B.

2°—If a cable acts as spare cable for one or more others, its lead sheath may be used as external conductor for the said other cables; in other words, it is sufficient to connect in parallel all of said cables at their ends.

The latter method is less perfect and less efficacious than the former, for the external conductor (protective lead sheath), which is so added to the service cables, has a great self-induction due to the iron armoring of the spare cable. For instance, for two cables of which one is used as spare cable, the self-inductance which becomes dangerous when an earthing occurs, is reduced but about one-half. But this may sometimes be sufficient in order to at a low cost avoid resonance in cables already laid and without the necessity of reopening the trench.

What I claim is:

1. An armored cable formed of successive lengths of cable, with a plurality of main conductors, comprising, for each length of cable a lead sheath protecting the main conductors from moisture, a magnetic armoring for said main conductors, and means for enclosing said magnetic armoring by secondary electric circuits, for reducing the excess voltages due to resonance or other causes.

2. An armored cable formed of successive lengths of cable, with a plurality of main conductors, comprising, for each length of cable a lead tube protecting the main conductors from moisture, a magnetic armoring for said main conductors, and a secondary circuit formed by the said protective lead tube and by a conductor, of suitable resistance, external to the length of cable and electrically connected to the ends of the lead tube of said length of cable, for the purpose described.

3. An armored cable formed of successive lengths of cable, with a plurality of main conductors, comprising, for each length of cable, a lead sheath protecting the main conductors from moisture, a magnetic armoring for said main conductors, and a secondary circuit formed by the said protective lead sheath and by a connection to the earth, through a suitable resistance, at each end of said length of cable, for the purpose described.

4. An armored cable formed of successive lengths of cable, with a plurality of main conductors, comprising, for each length of cable, a lead sheath protecting the main conductors from moisture, a magnetic armoring for said main conductors, and a secondary circuit formed by the protective lead sheath and by a conductor wound around said length of cable, between the magnetic armoring and the insulating covering thereof, for the purpose described.

5. An armored cable formed of successive lengths of cable, with a plurality of main conductors, comprising, for each length of cable, a lead sheath protecting the main conductors from moisture, a magnetic armoring for said main conductors, said armoring comprising a wire or strip wound on the cable, and a secondary circuit formed by the said protective lead sheath and by a metallic good conducting layer deposited on the armoring of the cable, for the purpose described.

6. An armored cable formed of successive lengths of cable, with a plurality of main conductors, comprising, for each length of cable, a lead sheath protecting the main conductors from moisture, a magnetic armoring for said main conductors, said armoring comprising a wire or strip wound on the cable, and a secondary circuit formed by the said protective lead sheath and by a strip of foil wound around the wire or strip of the magnetic armoring, for the purpose described.

7. An armored cable formed of successive lengths of cable, with a plurality of main conductors, comprising a lead sheath protecting the main conductors of each length of cable from moisture, a magnetic armoring for said main conductors, and a secondary circuit formed by the said protective lead sheaths of the successive lengths of cable, electrically connected inter se at the ends thereof, and by a conductor, of suitable resistance, external to the cable and electrically connected at the ends of the lead sheath of the first and of the last of these lengths of cable, for the purpose described.

8. An armored cable formed of successive lengths of cable with a plurality of main conductors, comprising a lead sheath protecting the main conductors of each length of cable from moisture, a magnetic armoring for said main conductors, and a secondary circuit formed by the said protective lead sheaths of the successive lengths of cable, electrically connected inter se at the ends thereof, and by a connection to the earth, through a suitable resistance, at the ends of the lead sheath of the first and of the last of these lengths of cable, for the purpose described.

9. In a system of parallel cables, each formed of successive lengths of cable, with a plurality of main conductors, and each comprising a lead sheath protecting the said main conductors from moisture and a magnetic armoring for said main conductors, the arrangement of a secondary circuit formed by the protective lead sheaths of said parallel cables, electrically connected in parallel together and to a single external conductor, common to all of said cables, for the purpose described.

In testimony whereof I have signed my name to this specification.

PAUL MARIE JOACHIM BOUCHEROT.

Witnesses:
S. ARMENGAMI,
W. DEFEVRIMONT.